June 15, 1943.  F. L. BISHOP ET AL  2,321,975
MANUFACTURE OF SHEET GLASS
Filed May 19, 1938

INVENTORS
Frederic L. Bishop
and Laurence P. Forman
By Stebbins, Blenko & Parmelee
ATTORNEYS Patented June 15, 1943

2,321,975

UNITED STATES PATENT OFFICE 2,321,975

MANUFACTURE OF SHEET GLASS

Frederic L. Bishop, Fox Chapel Manor, and Laurence P. Forman, Oakmont, Pa., assignors to American Window Glass Company, Pittsburgh Pa., a corporation of Pennsylvania Application May 19, 1938, Serial No. 208,850

2 Claims. (Cl. 49—17)

The present invention relates broadly to the manufacture of sheet glass and more particularly to a method and apparatus for reducing the characteristic wave and characteristic batter of drawn glass and for retarding the cooling of the glass within the drawing pit and for thereby lengthening the effective drawing period. The present invention is of such character that it may be utilized in connection with any of the presently known commercial methods of manufacturing sheet glass.

In the presently known commercial methods of manufacturing sheet glass the glass sheet is drawn continuously vertically from a bath of molten glass. In some of these processes the glass sheet is drawn continuously from the bath of glass in the drawing pit vertically through the drawing pit and then vertically through a relatively long lehr positioned above the pit. In other of these processes the glass is drawn vertically from the bath of glass in the drawing pit and passes vertically through a portion of the pit and then is turned horizontally over a roll and then passes through a horizontally extending annealing and cooling lehr, at the end of which the continuous sheet is cut to appropriate lengths. In some of these processes the glass is drawn from the bath through a floater or debiteuse having a longitudinally extending slot therein whereas in other of these processes the glass is drawn directly from the surface of the bath either with or without the use of a submerged drawing bar.

In all of these processes as practiced heretofore the glass produced has a characteristic wave extending longitudinally and in some cases latitudinally of the rising glass sheet. This wave is objectionable in view of the fact that it causes distortion of objects viewed therethrough and this is particularly true with respect to objects which are viewed at a relatively sharp angle therethrough. In addition to this defect the product resulting from the practice of the presently known processes has been objectionable from the standpoint of batter which likewise causes distortion of objects viewed through the glass sheet.

It is the purpose of the present invention to provide a method and apparatus whereby these defects can be reduced so as to render the resulting product more satisfactory.

In the presently known processes the glass in the bath in the drawing chamber adjacent the surface cools relatively rapidly and after a period of approximately 120 hours it has become sufficiently solidified to require the cessation of the drawing operation and the reheating of the glass in the drawing chamber. This cooling is irregular throughout the drawing pit and the irregular cooling detrimentally affects the character of the glass drawn. It it a further object of the present invention to retard the cooling of the glass in the bath and to regulate the cooling of the glass so as to render it more uniform throughout the area of the drawing chamber. By retarding the cooling the length of each drawing period is increased.

In accordance with our invention the objectionable waves and batter which have always been prevalent heretofore in drawn glass are materially diminished and reduced by the regulation of the cooling of the glass in the drawing pit so that it will cool more uniformly throughout the entire area of the surface of the bath and also by the provision of means within the drawing pit for partially protecting the meniscus of the rising glass sheet against stray air currents and by providing for the regulation of the temperatures of the gas currents which come in contact with the rising glass sheet adjacent the meniscus so that these gas currents will be more uniform throughout the entire width of the rising glass sheet. In the presently known processes this cooling of the glass is irregular and the air currents in the drawing pit which strike the glass sheet vary to a substantial extent throughout the width of the rising glass sheet. We have found that by controlling the cooling of the glass so as to render it more uniform and by equalizing the temperature of the air currents in the pit and by partially protecting the meniscus against stray gas currents of varying temperatures we can effectually improve the quality of the resulting product.

In the accompanying drawing we have shown for purposes of illustration only a preferred embodiment of our invention as applied to the Fourcault process. However, as has been pointed out above, our invention is not limited to this particular process but may be utilized in connection with any of the other presently known processes in which the glass sheet is drawn substantially continuously from the bath of molten glass.

In the drawing—

Figure 1:
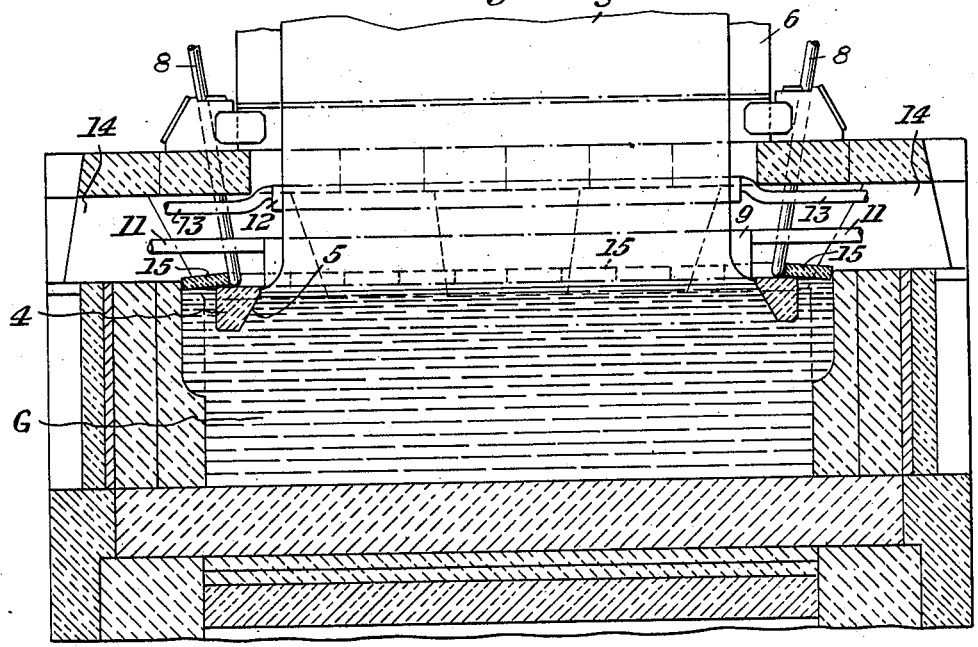
Figure 1 is a longitudinal section through a drawing pit embodying appropriate apparatus for carrying out our invention.
Figure 2:
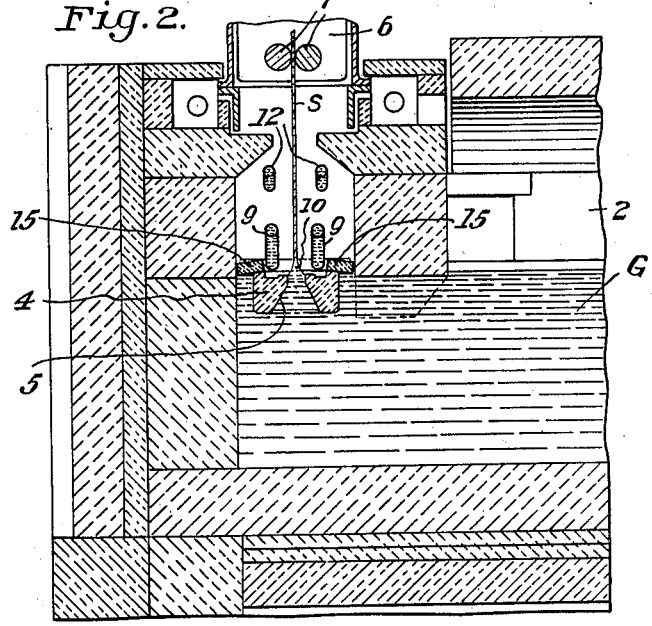
Figure 2 is a transverse section through the drawing pit shown in Figure 1 and showing a small portion of the canal leading to the drawing pit.
Figure 3:
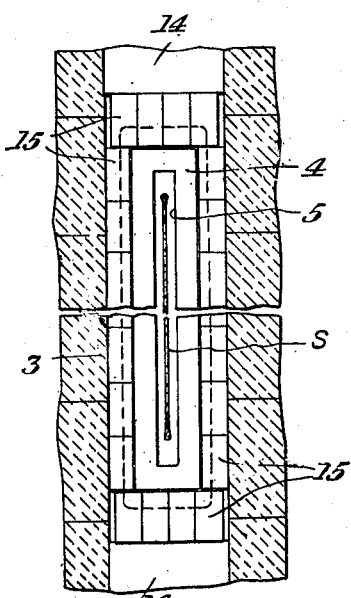
Figure 3 is a partial plan view showing the arrangement of the apparatus which we provide in the drawing pit.

In the structure shown in the drawing the molten glass "G" is fed from the canal 2 to the drawing pit or chamber 3. A debiteuse or floater 4 is provided in the drawing pit and the molten glass is drawn in the usual manner upwardly through the slot 5 in the debiteuse through the drawing pit 3 and into the vertically extending lehr 6 in which a plurality of rolls 7 is provided for causing the glass to travel upwardly through the lehr. The floater or debiteuse 4 is held in position in the usual manner by presser bars 8 which extend downwardly into the drawing pit. A water cooler 9 is provided on each side of the longitudinally extending slot 5 in the debiteuse and these coolers are positioned adjacent the meniscus indicated generally by the reference character 10 for the purpose of cooling and setting the molten glass into sheet form. These coolers are provided with pipes 11 for supplying water thereto and for discharging water therefrom. Positioned above the main coolers 10 are similar auxiliary coolers 12 which are used for the purpose of cooling the sheet and for properly annealing the glass sheet in accordance with the method described and claimed in the Monro Patent No. 2,002,544. These coolers are likewise provided with inlet and outlet pipes 13 for supplying water to and discharging it from the coolers. In normal operation the drawing pit is not maintained in an air-tight condition, air being permitted to enter the drawing pit through openings 14 on opposite edges of the rising glass sheet. This air, together with other air which may seep into the drawing pit through various cracks and openings, contacts the surface of the glass in the bath and also contacts the rising glass sheet "S" and travels upwardly therealong. This air in conjunction with the various other factors involved results in an unequal cooling of the glass in the bath and in unequal cooling of the rising glass sheet adjacent the meniscus, that is, before it has become sufficiently set not to be affected by air currents. Accordingly, we provide cooling retarding and equalizing means in the pit to retard the cooling of the glass to equalize the temperatures throughout the bath and throughout the length of the debiteuse 4, to equalize the temperature of the gas striking the rising glass sheet, and to partially block the passage of gas beneath the coolers. As shown in the drawing the cooling retarding and equalizing means may take the form of a course of refractory bricks 15 extending around the rising glass sheet between the floater 4 and the side and end walls of the drawing pit. These bricks 15 substantially cover the exposed surface of the glass bath, one end of each brick resting on the glass in the bath and abutting the adjacent wall and the other end resting upon the debiteuse. The end of each brick resting on the debiteuse along the side walls of the pit is spaced a short distance from the adjacent cooler and, consequently, some air can pass between the bricks and the coolers and between the coolers and the debiteuse and strike the rising glass sheet adjacent the meniscus but by the provision of bricks located in this manner this area is partially shielded so that a smaller amount of gas passes beneath the coolers and the debiteuse than is normally the case in apparatus of this character. In addition to lessening the amount of air contacting the meniscus these bricks, which of course are made of refractory material so as to withstand the high temperatures to which they are subjected, are uniformly heated and consequently tend to equalize the temperature of the gas which does pass beneath the coolers. In addition they cover the surface of the glass bath and prevent irregular cooling of the bath and materially retard the cooling thereof.

It will be understood that entirely satisfactory results may be obtained where a different arrangement of cooling retarding and heat equalizing means is used. For example, materials other than refractory brick may be employed and the arrangement thereof in the drawing pit may be materially varied. We have found that desirable improved results can be obtained where the brick course is not continued throughout the length of the pit, the central portion being left open so that the course assumes the form of two U-shaped sections located adjacent each end of the drawing pit. It will also be understood that various other modifications of the cooling retarding and heat equalizing means may be utilized and entirely satisfactory results obtained.

In the foregoing specification and in the appended claims we have stated that in accordance with our invention the temperature of the glass is rendered substantially uniform from one edge of the glass sheet to the other edge thereof. By this statement we do not mean to imply that the temperatures at various points are necessarily equal; for example, the temperatures prevailing at the edges of the rising glass sheet may be somewhat lower than those prevailing intermediate the edges. In stating that the temperatures are rendered uniform we mean that the temperature gradient from the center to each edge of the sheet is substantially uniform. In all prior processes the temperature gradient fluctuates materially whereas in accordance with our invention the temperature gradient is rendered substantially uniform.

In this application we have used the words "waves" and "batter." By these expressions we refer to any of the defects in the glass which produce distortion of objects when viewed therethrough, except stones, blisters, seeds, cats-eyes and like defects.

We claim:

1. Apparatus for drawing sheet glass comprising a drawing pit having a bath of molten glass therein, means for continuously drawing a sheet of glass from said bath, a debiteuse having a slot therein through which the molten glass is drawn, a cooler adjacent each face of the sheet for cooling and setting the molten glass into sheet form, and means extending between the cooler, the debiteuse and the adjacent side wall of the pit on each side of the glass sheet for retarding the cooling and equalizing the temperature of the glass in the bath and for at least partially shielding the meniscus of the rising glass sheet and equalizing the temperature of the gas striking the meniscus, whereby the temperature from one edge of the rising glass sheet to the other edge thereof is rendered more uniform.

2. Apparatus for drawing sheet glass comprising a drawing pit having a bath of molten glass therein, means for drawing a sheet of glass vertically from the bath, a debiteuse having a slot therein through which molten glass is drawn, a cooler adjacent each face of the sheet and adjacent the meniscus for cooling and setting the molten glass into sheet form, and means extending from the debiteuse and from the adjacent cooler to the adjacent side wall of the pit on each side of the glass sheet for retarding the cooling and equalizing the temperatures of the glass in the bath and for at least partially shielding the menicus of the rising glass sheet and equalizing the temperature of the gas striking the meniscus, whereby the temperatures prevailing in the rising glass sheet adjacent the meniscus and in the debiteuse are rendered more uniform.

FREDERIC L. BISHOP.
LAURENCE P. FORMAN.